(12) United States Patent
Ceravolo

(10) Patent No.: US 10,894,531 B1
(45) Date of Patent: Jan. 19, 2021

(54) ADJUSTABLE WEIGHT SUPPORTING APPARATUS

(71) Applicant: Frank Carmel Ceravolo, Daytona Beach, FL (US)

(72) Inventor: Frank Carmel Ceravolo, Daytona Beach, FL (US)

( * ) Notice: Subject to any disclaimer, the term of this patent is extended or adjusted under 35 U.S.C. 154(b) by 9 days.

(21) Appl. No.: 16/016,916

(22) Filed: Jun. 25, 2018

Related U.S. Application Data

(60) Provisional application No. 62/525,126, filed on Jun. 26, 2017.

(51) Int. Cl.

| | |
|---|---|
| *B60S 9/04* | (2006.01) |
| *B66F 7/26* | (2006.01) |
| *F16M 11/04* | (2006.01) |
| *B25H 1/00* | (2006.01) |
| *B66F 3/00* | (2006.01) |
| *A47B 13/00* | (2006.01) |
| *B25H 1/16* | (2006.01) |
| *B25H 1/02* | (2006.01) |
| *B25H 1/14* | (2006.01) |

(52) U.S. Cl.
CPC ........ *B60S 9/04* (2013.01); *B66F 7/26* (2013.01); *F16M 11/046* (2013.01); *A47B 13/003* (2013.01); *B25H 1/0007* (2013.01); *B25H 1/02* (2013.01); *B25H 1/14* (2013.01); *B25H 1/16* (2013.01); *B66F 3/00* (2013.01)

(58) Field of Classification Search
CPC ... B25H 1/14; B25H 1/16; B25H 1/02; B25H 1/0007; B66F 3/00; B66F 7/26; A47B 13/003; F16M 11/046; B60S 9/04
See application file for complete search history.

(56) References Cited

U.S. PATENT DOCUMENTS

| | | | | |
|---|---|---|---|---|
| 1,729,958 A | * | 10/1929 | Morris | A63G 1/00 52/151 |
| 3,012,771 A | * | 12/1961 | Wudel | B25H 1/0007 269/76 |
| 3,970,278 A | * | 7/1976 | Studer | B66F 13/00 248/352 |

(Continued)

FOREIGN PATENT DOCUMENTS

EP 3561198 A1 * 10/2019 ............... B25H 1/04

*Primary Examiner* — Eret C McNichols
(74) *Attorney, Agent, or Firm* — Malin Haley DiMaggio & Bowen, P.A.

(57) ABSTRACT

An apparatus for partially supporting a vehicle is provided especially for a vehicle having a very limited area on its underside within which to safely apply an upward force, including vehicles with a small distance between the bottom of the chassis and the ground such as a sports car which allows the user to position a lifting jack under the vehicle at the proper access jack point for engagement of the lifting a portion of the vehicle, and lifting the jack and vehicle portion upwardly to a desired height. The legs of the jack stand can be temporarily inserted into a support member engaging the vehicle and the jack. The jack stand includes a horizontal support member with bottom facing open ends telescopically connected to a pair of rigid legs and each of the legs are telescopically attached to supporting bases using locking pins. Once the jack stand is installed, the lifting jack can be removed.

7 Claims, 10 Drawing Sheets

(56) References Cited

U.S. PATENT DOCUMENTS

| | | | | |
|---|---|---|---|---|
| 4,231,557 A * | 11/1980 | Blachly | B25H 1/04 | 269/139 |
| 4,364,548 A * | 12/1982 | Eccardt | B25H 1/04 | 108/156 |
| 4,708,362 A * | 11/1987 | Raetz | B60S 9/04 | 280/763.1 |
| 5,165,265 A * | 11/1992 | Maionchi | B60R 25/001 | 248/352 |
| 5,666,888 A * | 9/1997 | Dame | A47B 9/06 | 108/147.21 |
| 5,901,935 A * | 5/1999 | Lai | F16M 11/046 | 248/354.1 |
| 5,915,672 A * | 6/1999 | Dickey | B66F 3/24 | 248/352 |
| 6,173,660 B1 * | 1/2001 | Emmert | B25H 1/06 | 108/116 |
| 6,464,192 B1 * | 10/2002 | Gibbs, Jr. | B66F 1/025 | 248/352 |
| 8,348,071 B1 * | 1/2013 | Janlert | F16M 5/00 | 211/175 |
| 8,485,488 B2 * | 7/2013 | Forrest | A47B 91/02 | 248/188.8 |
| 9,335,001 B1 * | 5/2016 | Ceravolo | F16M 11/26 | |
| 9,446,743 B2 * | 9/2016 | Madison | B60S 9/22 | |
| 9,725,286 B1 * | 8/2017 | Christopher, Jr. | B66F 3/00 | |
| 2002/0125395 A1 * | 9/2002 | Valentz | E04D 13/12 | 248/354.1 |
| 2008/0203265 A1 * | 8/2008 | Zhang | B25H 1/0007 | 248/352 |
| 2009/0283653 A1 * | 11/2009 | Zhang | F16M 11/046 | 248/352 |
| 2012/0193501 A1 * | 8/2012 | Lai | B25H 1/02 | 248/423 |
| 2014/0145044 A1 * | 5/2014 | Ceravolo | F16M 11/22 | 248/157 |
| 2015/0084254 A1 * | 3/2015 | Southwell | B23K 37/0452 | 269/17 |
| 2017/0334059 A1 * | 11/2017 | Moffat | B25H 1/16 | |
| 2018/0001466 A1 * | 1/2018 | Brunner | B25H 1/04 | |

\* cited by examiner

ADJUSTABLE WEIGHT SUPPORTING APPARATUS

CROSS-REFERENCE TO RELATED APPLICATION

This application claims benefit of provisional U.S. Patent Application Ser. No. 62/525,126, filed on Jun. 26, 2017.

FIELD OF THE INVENTION

The invention relates to a weight supporting apparatus. More particularly, the invention relates to a weight supporting apparatus, adjustable in height, usable in automotive applications.

BACKGROUND

With many modern automobiles, especially high performance makes such as Porsche, only a limited amount of space exists under the chassis of the automobile whereby a lifting device may be applied. In many cases, due to this limited space, and once the automobile has been lifted, it is not possible to place jack stands, aka "axle stands" or "safety stands," under the chassis because that limited space to receive the jack stand, i.e. the jacking point, is now being occupied by a lifting device. Often, the lifting device is a hydraulic floor jack, which occupies the jacking point space to a degree that there is no room left for the proper placement of a jack stand. These limited spaces to receive a jack stand have been designated by the factory, and supporting the automobile with jack stands outside of these designated spaces presents hazards to the vehicle as well as the person working under or around the vehicle.

What is needed is a weight supporting apparatus that is easily locatable under a weight to be supported. What is also needed is a weight supporting apparatus, adjustable in height, to fit a given application. Additionally, what is needed is a method to use a weight supporting apparatus to support a weight with limited clearance that is adjustable in height. What is also needed is a weight supporting device that may be substantially disassembled for convenient storage.

SUMMARY

According to embodiments of the present invention, a weight supporting apparatus is provided that is easily locatable under an object, e.g., an automobile that is to be supported. Additionally, the weight supporting apparatus is adjustable to fit a given application. A method is also described for using an adjustable weight supporting apparatus to support an object, e.g., an automobile, with limited clearance. Furthermore, the weight supporting apparatus can be a weight supporting device that may be substantially disassembled for convenient storage.

According to an embodiment of the present invention, an adjustable weight supporting apparatus is provided with an object support member, an adapter, and a leg. The support member may include an elongated portion for supporting an object. The support member may include open ends; the support member open ends may be vertically oriented so that the leg first end insert into the support member vertically; alternatively the support member open ends may be oriented diagonally so that the first end of the leg inserts into the support member diagonally. The adapter may be securable on the support member to receive the object. The leg may include a first end and a second end. The first end is insertable into the support member to a depth. The second end may include a foot. The second end is extendable to engage a support surface with the foot. The support member is locatable adjacent to a lifting device.

In another aspect, the leg may include a channel and wherein a pin is locatable in the channel to fix the depth of insertion for the leg into the support member.

In another aspect, the first end of the leg may include a lock channel to align with a lock hole included on the support member. A pin may be insertable through the lock hole and the lock channel to fix the depth of the first end of the leg in the support member.

In another aspect, the support member may include a plurality of adapters configured to interface with a plurality of objects. The support member may be rotatable to position one of the plurality of adapters to engage at least one of the plurality of objects, respectively.

In another aspect, the adapter is removably attachable to the support member. The support member may further include a port to operatively receive the adapter.

In another aspect, a spacer may be locatable between the adapter and the port of the support member to adjust a height at which the adapter receives the object.

In another aspect, the foot may include a traction surface to interface with a support surface.

According to an embodiment of the present invention, an adjustable weight supporting apparatus may be provided having a support member, a leg, and an adapter. The support member may support an object. The support member may include a locking hole. The leg may include a first end and a second end. The first end may include a locking channel. The first end of the leg may be insertable into the support member to a depth selectable by aligning the locking channel with the locking hole. The depth may be temporarily fixable by passing a pin through the locking hole and the locking channel. The second end may extend downwardly to a supporting surface. An adapter may be temporarily securable on the support member to receive the object. The adapter may be operatively receivable by a port of the support member. The support member is receivable by a lifting device.

In another aspect, a spacer is locatable between the port of the support member and the adapter to adjust a height at which the adapter engages the object. A bottom surface of the support member may include a jack adapter to receive the lifting device.

In another aspect, the second end of the leg is adjustably received by a base support member. The base support member engages the leg second end. The base support member may be of any shape necessary to achieve balance and stability between the apparatus and a supporting surface. A height adjustable apparatus is configurable by temporarily fixing the leg to the base support member at a desired depth of insertion.

According to an embodiment of the present invention, a method is provided for adjustably supporting an object using a weight supporting apparatus. The weight supporting apparatus may include an adapter, a leg, and a support member for supporting the object. The method may include (a) locating the support member adjacent to the object to receive the object and a lifting device. The method may additionally include (b) engaging the support member by the lifting device to apply a lifting force from the lifting device to the support member. Also, the method may include (c) engaging the object by the support member to apply the lifting force from the support member to the object, the object being receivable by the support member using the adapter. The method may include (d) engaging the support member with a first end of the leg and temporarily fixing the leg to the support member. The method may include (e) positioning a second end of the leg into the base support member. Furthermore, the method may include (f) removing the lifting device by ceasing to apply the lifting force.

In another aspect, step (d) of the method may further include inserting a first end of the leg into the support member to a depth and temporarily fixing the leg to the support member.

In another aspect, step (d) of the method may further include locating the leg below the support member to receive and support the support member.

In another aspect, the first end of the leg may include a lock channel to align with a lock hole included on the support member. In this aspect, step (d) of the method may further include (h) inserting a pin through the lock hole and the lock channel to temporarily fix a depth of the first end of the leg in the support member.

In another aspect, the support member may include a plurality of selectable adapters. In this aspect, prior to step (a), the method may include (i) selecting the adapter form the plurality of adapters that is compatible with the object.

The support member openings may or may not have closed ended open ends. In an aspect where the support member has closed ended open ends, the legs may insert into the support member open ends to a depth sufficiently that the uppermost ends of the legs contact the closed ended upper ends of the support member so that the load sustained by the support member is transmitted through the uppermost ends of the legs rather than the attachment pins.

In another aspect, a support member may have downwardly protruding ends, whereby each end inserts to a depth into the upper end of a leg having open upper and lower ends, and whereby a base member inserts into the leg's bottom open end to a depth. The downwardly protruding ends may protrude directly downward, or may protrude diagonally. The top surfaces of the support member ends may be beveled to provide additional clearance between the support member and a vehicle. Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention will now be described in detail with reference to embodiments thereof as illustrated in the accompanying drawings. In the following description, an adjustable weight supporting apparatus will be discussed. Those of skill in the art will appreciate alternative labeling of the adjustable weight supporting apparatus as a weight supporting apparatus, jack stand, apparatus, device, the invention, or other similar names. Skilled readers should not view the inclusion of any alternative labels as limiting in any way.

Additionally, the following disclosure may be described in the context of lifting an automobile to perform repairs and include examples related to the same. This context of disclosure has been chosen to clearly illustrate an embodiment of the present invention. However, skilled artisans will appreciate additional applications for the present invention, which may be used outside of the automotive context. Other embodiments may include virtually any scenario where a weight is supported. As such, the present invention should not be limited to applications of supporting the weight of an automobile.

Referring now to FIGS. 1-5, an additional embodiment of the present invention will now be discussed.

Figure 1:
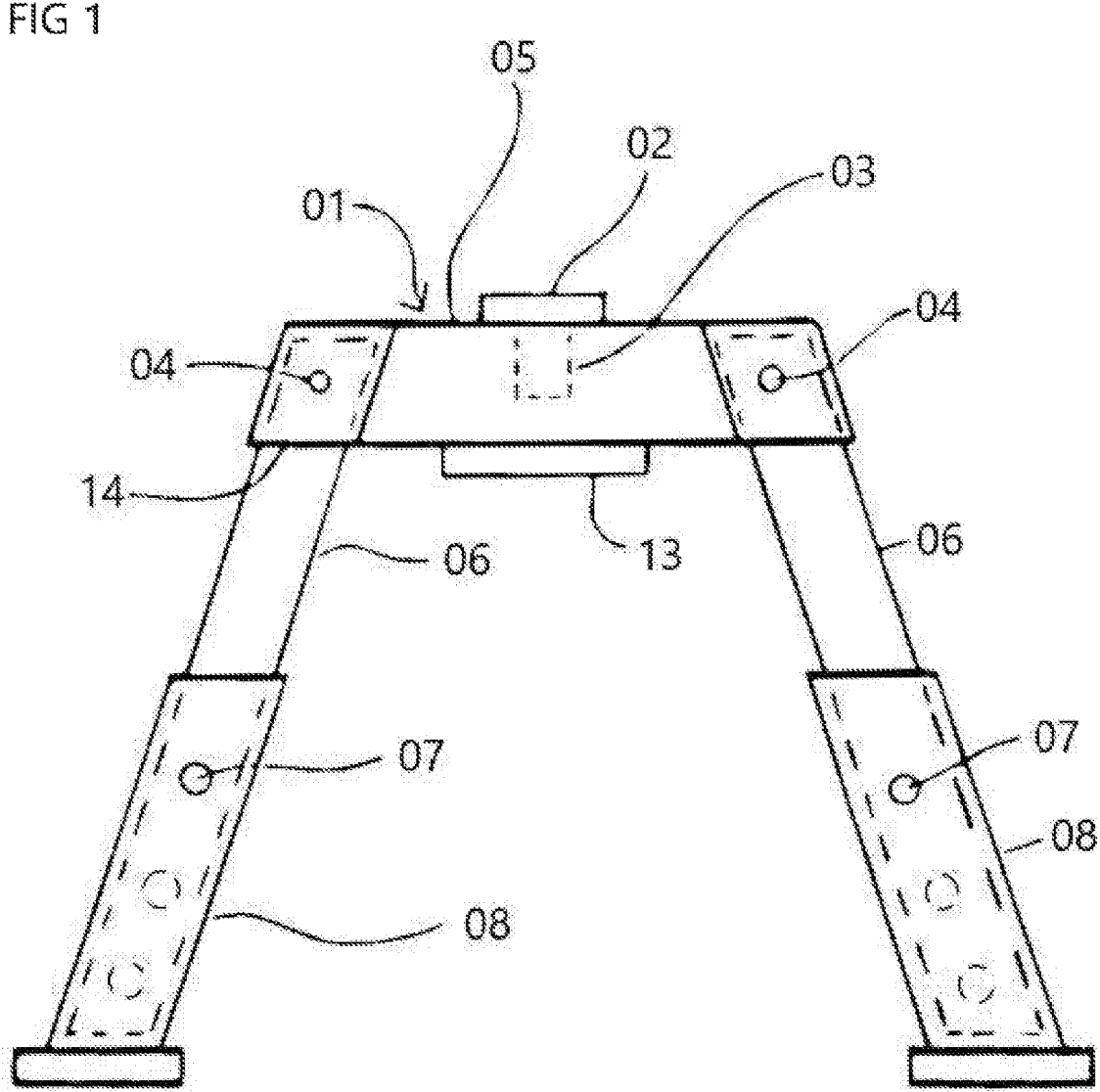
FIG. 1 is a front elevation view of a weight supporting apparatus, according to an embodiment of the present invention.

FIG. 1 shows an embodiment of weight supporting device 01. The overall shape of the weight supporting device 01 shown in FIG. 1 is trapezoidal. However other shapes are possible such as rectangular. A pair of base support members or bases 08 are used to support the device 01. Mounted telescopically within each base 08 is a leg 06. The legs 06 are held in place with each base 08 by pins 07. When the pins 07 are removed from each base 08, each leg 06 can be removed from each base 08. Each leg 06 is connected into each support member bottom facing end opening 14 of support member 05. A pair of removable pins 04 are used to connect each leg 06 to support member 05. On the top surface of support member 05 is mounted removably an adapter 02 that engages the vehicle surface or jack point that is being lifted and will be supported by the invention. The adapter 02 removably fits into an adapter port 03 on the top surface of the support member. On the bottom surface of the support member 05 is a bottom plate 13 to interface with a lifting device and provide additional stability.

Figure 2:
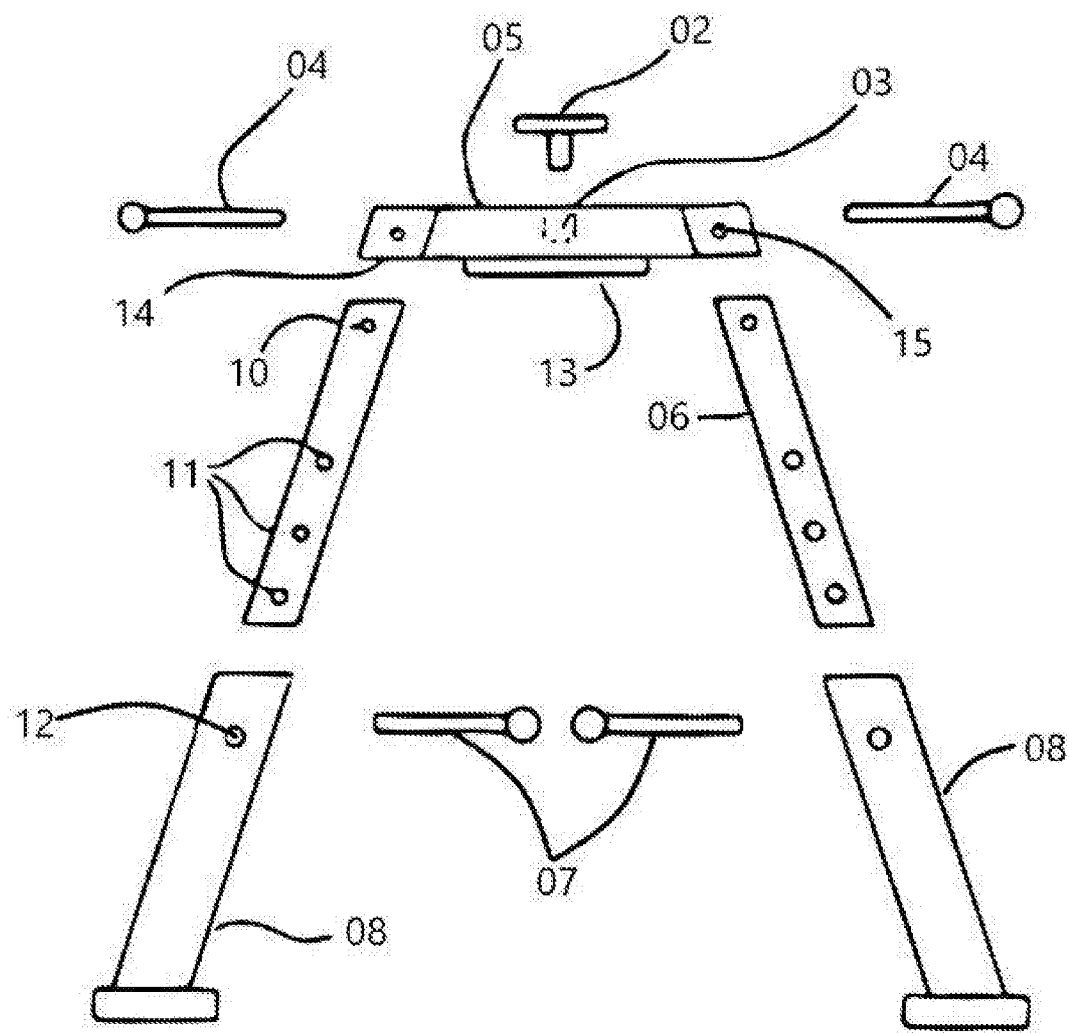
FIG. 2 is a exploded view of a weight supporting apparatus, according to an embodiment of the present invention.

FIG. 2 is an exploded view of the weight supporting apparatus 01 described above. A pair of removable pins 04 are used to connect each leg 06 to support member 05 by inserting the upper end of the leg 06 into the support member end opening 14 to a depth and passing the pins 04 through the support member pin holes 15 and leg upper pin channels 10 to temporarily affix the leg 06 to the support member 05.

The legs 06 are held in place with each base 08 by passing pins 07 through base pin holes 12 and through one of the leg lower pin channels 11.

Figure 3:
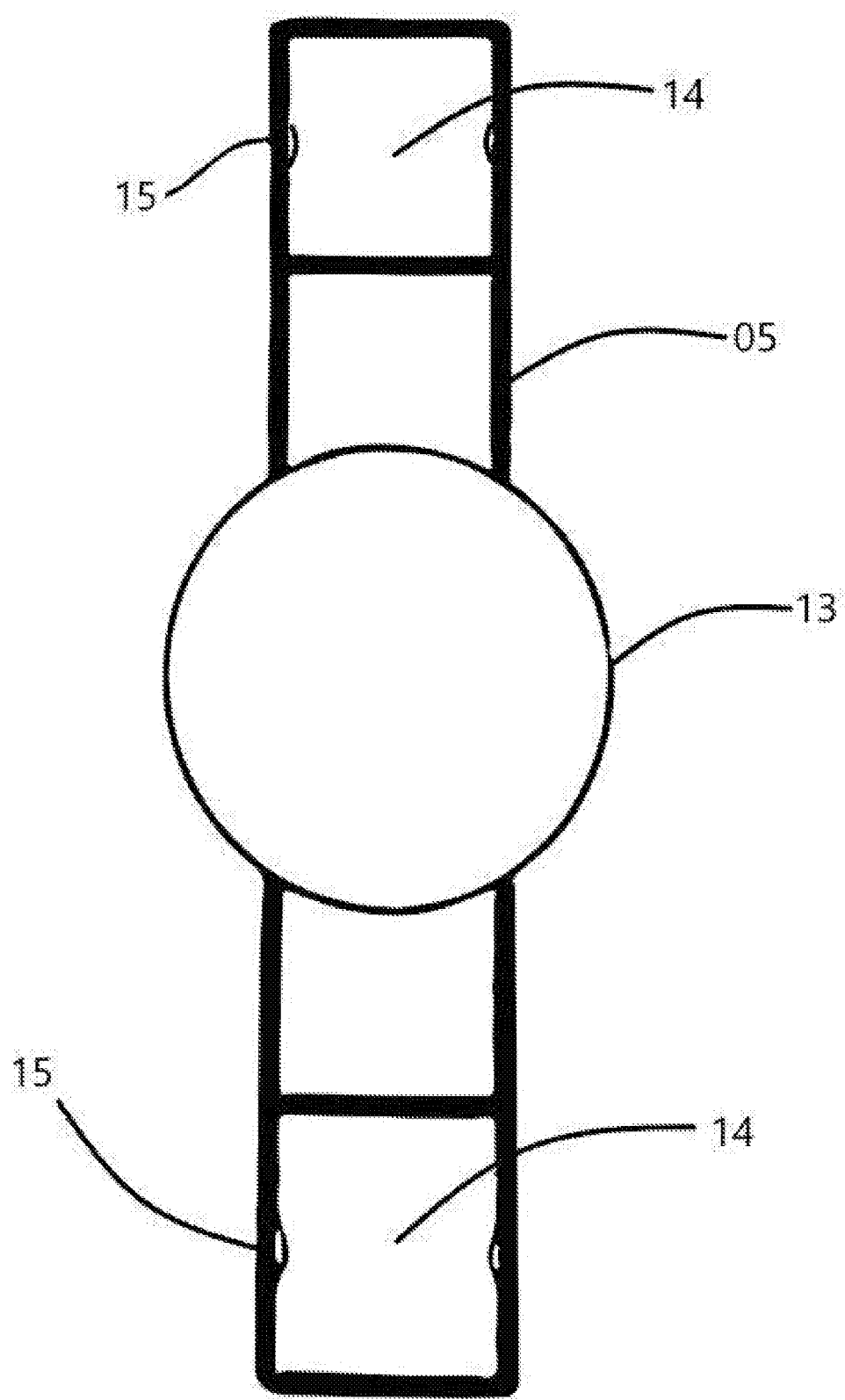
FIG. 3 is a underside view of the support member, according to an embodiment of the present invention.

FIG. 3 shows the underside of support member 05 with bottom plate 13 and support member end opening 14 and pin holes 15 for receiving pins 04.

Figure 4:
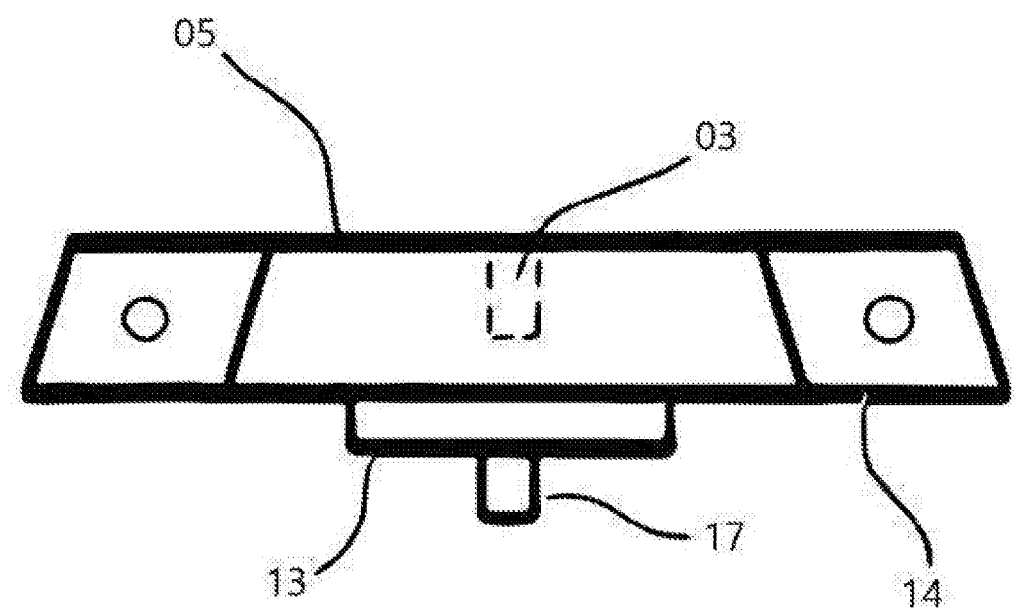
FIG. 4 is an alternate embodiment of the support member with a peg on its underside to interface with a lifting device.

FIG. 4 shows support member 05 with support member end openings 14 and with port 03 to receive an adapter and peg 17 protruding downward from the bottom surface of the bottom plate 13 to interface with a lifting device.

Figure 5:
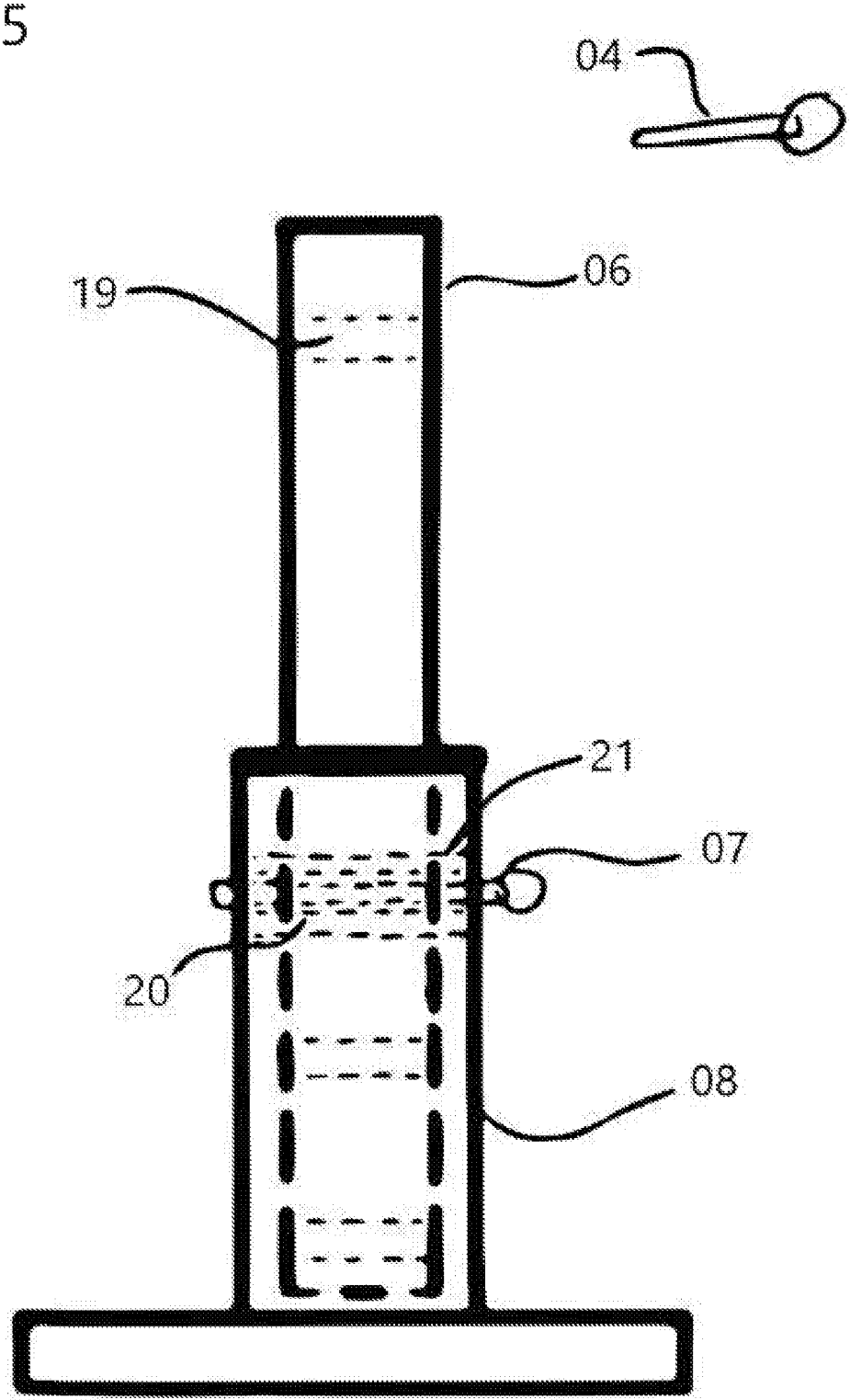
FIG. 5 is a side elevation view of a base support member, according to an embodiment of the present invention.

FIG. 5 shows a side elevation view of the leg 06 inserted to a depth into the base 08 and temporarily affixed together with a pin 07 through one of the leg lower pin channels 20 and base channel 21 to adjust the height of the apparatus 01. The leg upper pin channel 19 of the leg 06 to receive pin 04 to temporarily affix leg 06 to support member 05 once leg 06 is inserted into support member 05 to a depth.

Figure 6:
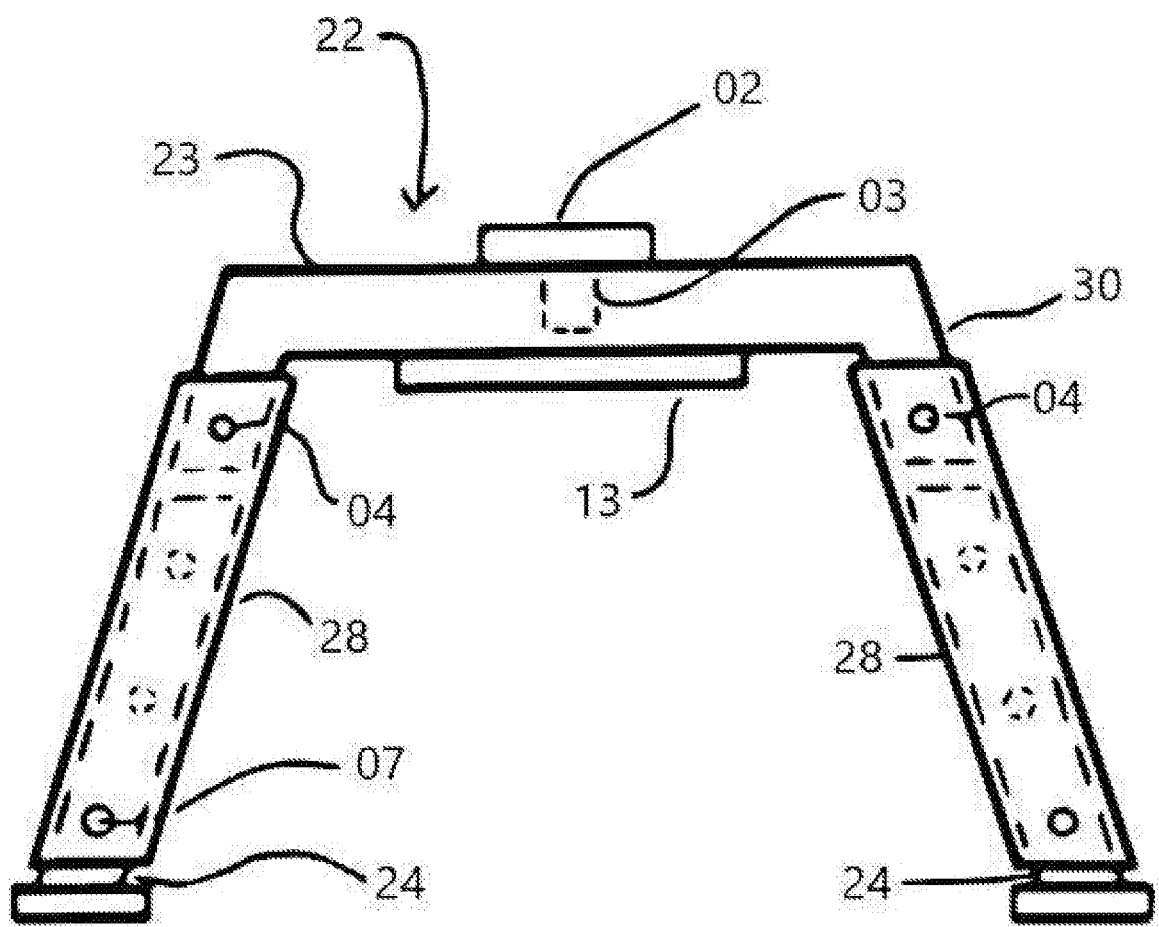
FIG. 6 is a front elevation view of a weight supporting apparatus, according to an alternate embodiment of the present invention.

FIG. 6 shows an alternate embodiment of the invention. The overall shape of the weight supporting device 22 shown in FIG. 6 is trapezoidal. However other shapes are possible such as rectangular. A pair of base support members or bases 24 are used to support the device 22. Each base 24 mounts telescopically inside a leg 28. When pins 07 are removed from each base 24, each base 24 can be removed from each leg 28. Each downwardly protruding end 30 of the support member 23 is connected into the upper end of a leg 28. A pair of removable pins 04 are used to connect each leg 28 to support member 24. On the top surface of support member 23 is mounted removably an adapter 02 that engages the vehicle surface or jack point that is being lifted and will be supported by the invention. The adapter 02 removably fits into an adapter port 03 on the top surface of the support member. On the bottom surface of the support member 23 is a bottom plate 13 to interface with a lifting device and provide additional stability.

Figure 7:
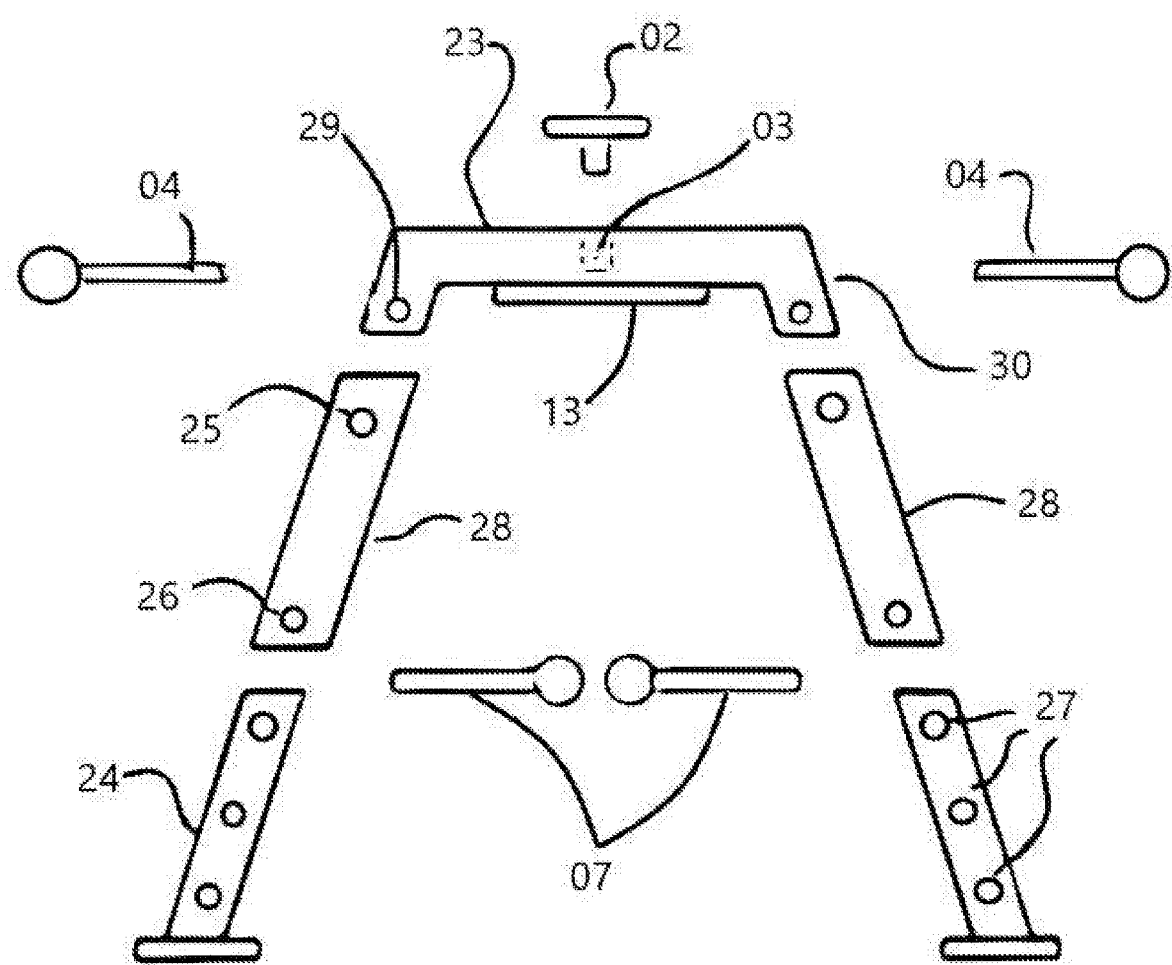
FIG. 7 is an exploded view of a weight supporting apparatus, according to an alternate embodiment of the present invention.

FIG. 7 is an exploded view of the weight supporting device 22 described above. The legs 28 are held in place with each base 24 by pins 07 by passing the pins 07 through the leg lower pin holes 26 and one of the base pin channels 24. The legs 28 are held in place with the support member 23 by passing the pins 04 through the leg upper pin holes 13 and support member pin channels 29 located on the downwardly protruding ends 30 of support member 23.

Figure 8:
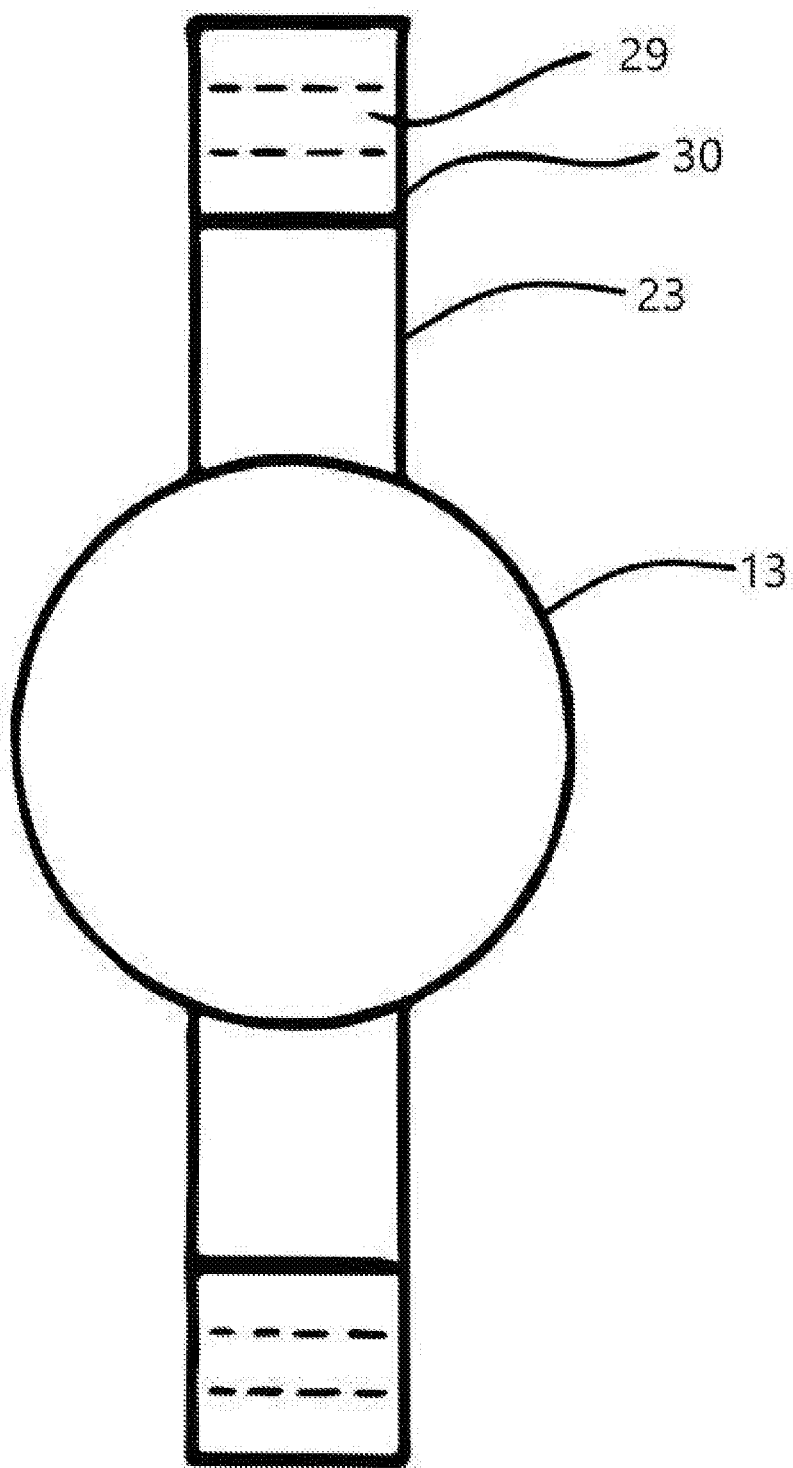
FIG. 8 is an underside view of the support member, according to an alternate embodiment of the present invention.

FIG. 8 shows the underside of support member 23 with bottom plate 13 and support member downwardly protruding ends 30 and support member pin channels 29 for receiving pins 04.

Figure 9:
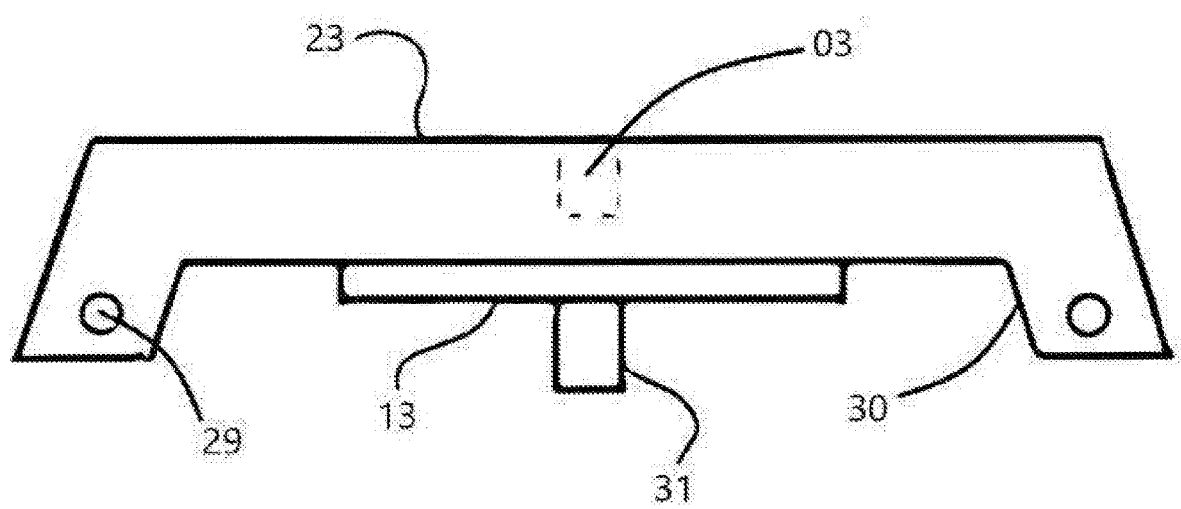
FIG. 9 is an alternate embodiment of the support member with a peg on its underside to interface with a lifting device.

FIG. 9 shows an alternate embodiment of a support member 23 with adapter port 03 and a peg 31 protruding downward from the bottom surface of the bottom plate 13 to interface with a lifting device and support member downwardly protruding ends 30 and support member pin channels 29 for receiving pins 04.

Figure 10:
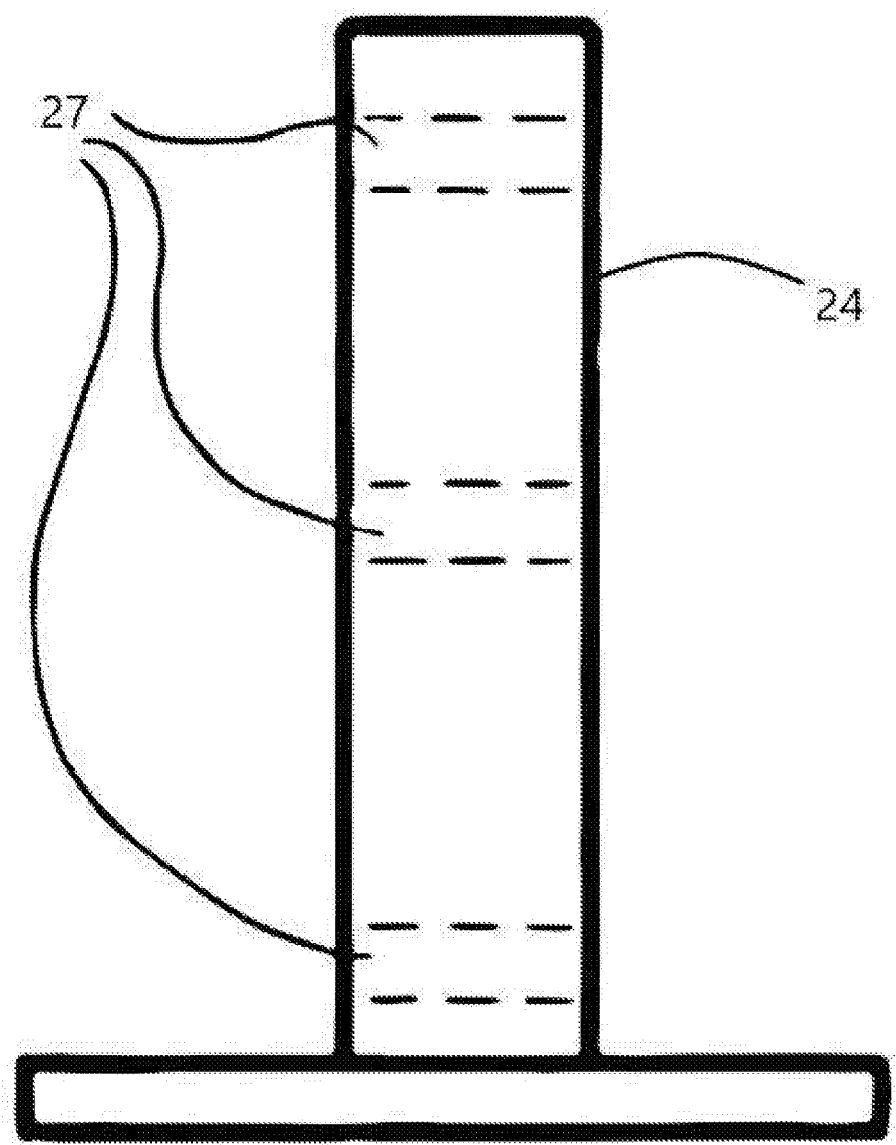
FIG. 10 is a side elevation view of a base support member, according to an alternate embodiment of the present invention.

FIG. 10 shows a side elevation view of the base 24 with base pin channels 27.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An apparatus for a jacking operation to lift a vehicle, comprising:
    a horizontal elongated support member having a longitudinal axis and having first and second bottom facing open ends, said horizontal elongated member having an upper midsection for supporting a vehicle engaging adapter;
    vehicle engaging adapter securable on the elongated support member midsection to receive and engage a location on a vehicle specifically for lifting a portion of the vehicle;
    a pair of base members resting on a ground/floor; each having an upper end opening;
        a pair of legs each having a first upper end and a second lower end, said each leg first upper end being inserted into the elongated support member first and second bottom facing open ends to a depth, and said each leg second lower end being inserted into the upper end opening of each base member to a depth, wherein the elongated support member is substantially trapezoidal, and wherein the elongated support member includes a top surface and bottom surface and is substantially trapezoidal, and vertical end faces surfaces non-parallel, wherein the top surface of the elongated support member is shorter than the bottom surface of the elongated support member and the bottom surface of the elongated support member includes a bottom plate to interface with a lifting device.

2. The apparatus of claim 1, wherein the first end of the leg comprises a lock channel to align with a lock hole included on the elongated support member, a pin being insertable through the lock hole and the lock channel to selectively fix the depth of the first end of the leg in the elongated support member.

3. The apparatus of claim 1, wherein the support member includes a stop to determine the depth of the leg inserted into the support member.

4. The apparatus of claim 1, wherein the elongated support member includes a peg on its bottom surface to interface with a lifting device.

5. The apparatus of claim 1, wherein the adapter is removably attachable to the elongated support member, and wherein the elongated support member further includes a port to operatively receive the adapter.

6. The apparatus of claim 5, further comprising a spacer locatable between the adapter and the port of the elongated support member to adjust a height at which the adapter receives the object.

7. The apparatus of claim 1, including:
    said elongated support member having a bottom plate and a peg extending downwardly perpendicular to said elongated support member bottom plate for engagement with a lifting device.

* * * * *